D. S. DE LAVAUD.
FLUID POWER TRANSMISSION.
APPLICATION FILED JUNE 14, 1917.

1,308,170.

Patented July 1, 1919.
7 SHEETS—SHEET 1.

D. S. DE LAVAUD.
FLUID POWER TRANSMISSION.
APPLICATION FILED JUNE 14, 1917.

1,308,170.

Patented July 1, 1919.
7 SHEETS—SHEET 5.

Dimitri Sensaud De Lavaud, Inventor:
By his Attorney

UNITED STATES PATENT OFFICE.

DIMITRI SENSAUD DE LAVAUD, OF NEW YORK, N. Y.

FLUID POWER TRANSMISSION.

1,308,170.  Specification of Letters Patent.  Patented July 1, 1919.

Application filed June 14, 1917. Serial No. 174,691.

*To all whom it may concern:*

Be it known that I, DIMITRI SENSAUD DE LAVAUD, citizen of the United States of Brazil, residing at 1649 Amsterdam avenue, New York city, New York, U. S. A., have invented new and useful Improvements in Fluid Power Transmissions, of which the following is a specification.

My invention relates to the transmission of power from a prime mover or the like, and provides a simple, efficient, reliable and compact mechanism, for pumping a continuously circulating fluid and delivering such fluid to one or more nozzles for discharge relatively to a turbine wheel or wheels to rotate the wheel or wheels at varying speeds and torques. The pump devices are preferably arranged as opposed banks of cylinders, arranged in pairs with the pistons of the opposed cylinders of each pair on a common piston-rod; these pistons preferably being operated from a cam-shaft or the like, extending between the banks of cylinders; all the cylinders of each bank being preferably controlled by a single oscillatory valve member, both for suction and delivery, operated from the cam-shaft.

The invention itself, and objects and advantages other than those mentioned above, will be clearly understood from the following description, taken in connection with the accompanying drawings, showing preferred forms of apparatus illustrative of the mechanism of the invention, and particularly suitable for use in an automobile. In these drawings, in which similar reference characters designate corresponding parts in all views.

Referring to Figs. 1 to 9, the transmission comprises a casing 1 within which is suitably mounted, as upon the ball-bearings 2, a shaft 3, which may be provided with a squared end 4, by means of which it is connected to a prime mover, such as the usual gasolene engine of an automobile (not shown). Located on each side of the casing 1 is a block 5 containing a bank of cylinders 6, preferably located with the individual cylinders of one bank exactly opposite those of the other bank. Each pair of opposed cylinders, consisting of one cylinder of each bank, is provided with a common piston member 7 adapted to reciprocate therein, and provided intermediate the cylinders with a cam-surface, preferably the yoke portion 8. This is located within the casing so that the shaft 3 is disposed within the yoke portion 8, and on this shaft 3 are keyed or otherwise secured cams 9 corresponding to each yoke by means of which, when the shaft 3 is rotated, reciprocatory movement is imparted to the common piston member 7 of which the yoke is a part. The cams 9 are disposed upon the shaft 3 in different and preferably equally spaced angular relations or phases so as to cause continuous operation and the successive delivery of all the cylinders; and may be spaced axially by plates 33 if desired.

Disposed in the block 5 near the head of the cylinders 6 are suction passages 10 and delivery passages 11; and leading from each of these main passages toward their respective cylinders are branch suction passages 12 and branch delivery passages 13 for each cylinder. These passages lead to a common valve member 14 for each bank of cylinders preferably disposed immediately adjacent the heads of the cylinders of the respective banks. This common valve member 14 preferably comprises an oscillatory cylinder provided with a separate passage 15 therethrough for each pump cylinder, which passage 15 is adapted to place the pump cylinder in communication with either the corresponding branch suction passage 12 or the branch delivery passage 13.

The oscillatory valve member 14 may be driven by means of a pin 16 (see Figs. 2, 4, 7 and 8), eccentrically disposed at one end of the member, and adapted to be moved back and forth by means of the yoke portion of a valve actuating rod 17 which is provided for the purpose. I prefer to arrange the valve members and operating means so that the maximum distance through which the valve member is rotated is 45°.

The passages 15 are disposed in the valve member 14 in different angular positions, so as to bring each cylinder into communication with the proper branch passage at the moment the piston in that cylinder reaches the beginning of the suction or delivery stroke, as determined by the setting of the actuating cam 9 of that particular cylinder upon the shaft 3.

In order to permit of inspection, adjustment and removal of the valve member 14, a removable cap 19 may be located in the end of the block 5 in line with the valve member.

The main delivery passage 11 carries the fluid to the nozzles 20, where it is utilized to drive the turbine wheels 21. The fluid reaches the nozzles 20 from the passages 11, because each nozzle is fixed upon a hollow shaft 25 turning in a main delivery passage 11, the interior of each nozzle being at all times in communication with the interior of its shaft 25 and its passage 11.

As many turbine wheels 21 may be used as desired; and in the case of an automobile it is preferable to use four such wheels as illustrated, these wheels being independent, and arranged each to drive one wheel of the vehicle through the shaft 22, universal joints 23 and further suitable connections not shown. Each of the turbine wheels 21 is provided with vanes 24 of approved design, (shown dotted in Fig. 2), which vanes extend from the outer circumference of the wheel nearly to the center thereof.

Figure 6:
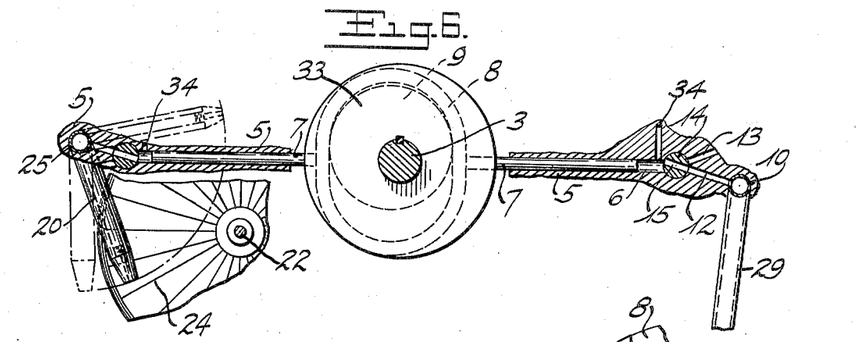
Fig. 6 is a detail, partly in section, showing the nozzle construction and arrangement.
Figures 7, 8:
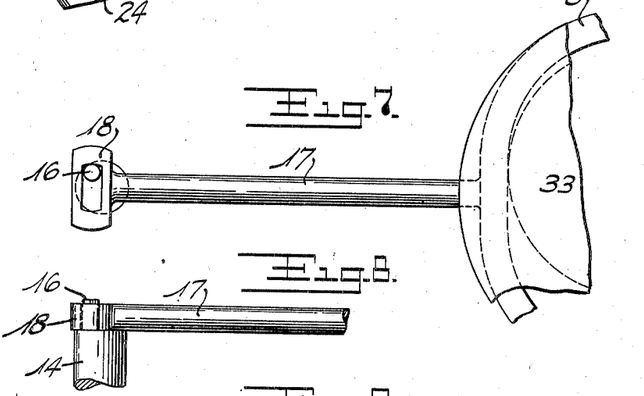
Fig. 7 is an elevation of the valve operating rod shown in Fig. 4.
Fig. 8 is a plan view of part of Fig. 7.
Figure 9:
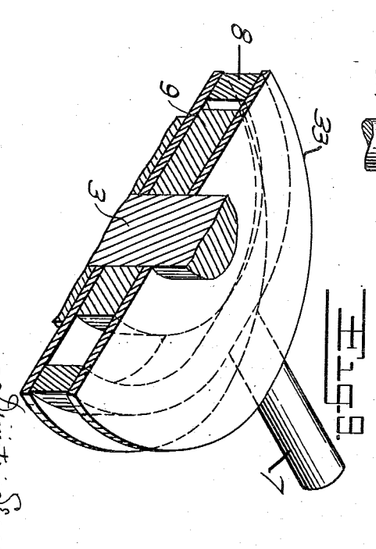
Fig. 9 is a detail perspective view partly in section showing the cam and yoke construction.

The hollow shafts 25 are revolubly mounted in the casing, so as to permit of the nozzle directing the fluid against the vanes at any point from the outer rims of the wheels to the inner ends of the vanes, and so as to rotate the wheels in either direction, and to allow of the nozzle assuming a position, such as the left hand dotted position shown in Fig. 6, in which the fluid will pass by without touching the vanes of the wheels, and no power will be transmitted.

In the case of an automobile, it is desirable that equal power should be transmitted to each of the four wheels at all speeds. The shafts 25 to which the nozzles are attached may therefore be provided with arms 26 interconnected by means of a rod 27 so as to conjointly control the positions of the nozzles in order that the streams from each nozzle may be directed against the vanes of the corresponding turbine wheel at the same distance from the center of each. The rod 27 may be operated by any suitable system of levers (not shown) leading to a convenient position near the operator.

The fluid after it has passed through the turbine wheel vanes collects at the bottom of the casing 1 in the channel 28 provided at the lower part thereof, and is drawn up from this channel through the pipe 29 into the main suction pipe 10 whence it is drawn into the cylinders on their respective suction strokes and recirculated through the system.

Upon the outer rim of the turbine wheels 21 may be disposed brake bands 30 adapted to be operated in the usual manner, by means of the shafts 31, which may be connected together by a rod 32 arranged to be operated by a leverage system (not shown) leading to a point convenient to the operator.

While the apparatus which I have described is capable of operating with any fluid, I find that the best results are obtained by using a metal in its liquid form; and because of its density, it is possible to make the apparatus very compact, and to obtain very high efficiency. If mercury is used as the circulating fluid, it is open to the objection that it has a tendency to amalgamate with the metallic parts of the apparatus, and thus to clog and interfere with the flow of the fluid through the various passages, and decrease the efficiency of operation. In order to overcome this difficulty, I mix with the mercury a small quantity of a substance which is capable of preventing the amalgamation of the mercury with the other metal parts; for this purpose I prefer to use oil, which has the additional advantage of serving as a lubricant for the moving parts.

In operation, the hermetically sealed casing 1 is provided with a quantity of mercury, with which is preferably mixed a small quantity of oil, sufficient to fill all the passages and cylinders, and the channels 28, but not enough to interfere with the rotation of the turbine wheels. The shaft 4 is rotated by means of the prime mover (not shown), and thus causes the various cams to actuate the pistons 7 in the cylinders 6, and the oscillatory valve members 14, causing the fluid to be drawn into the cylinders from the channel 28 through the main suction passages 10 and the respective branch passages 12, whence it is delivered on proper movement of the valve 14 through the branch delivery channel 13 to the main channel 11, and thence through the hollow shaft 25 and nozzles 20 against the vanes of the turbine wheels 21, which are thus caused to rotate. As applied to an automobile, when the vehicle is standing, the motor is started, and the fluid is delivered from the nozzles when in the off position, or left hand dotted position of Fig. 6, so that there is no tendency to rotate the wheels. In order to start the vehicle, the rod 27 is moved by the operator so as to move the nozzles 20 and direct the stream against the outer ends of the turbine wheel vanes. In this position the maximum torque is obtained; and as the vehicle begins to move, the nozzles may be moved so as to direct the stream of fluid against the vanes nearer and nearer to the center of the wheels, thus obtaining the maximum car speed for a given speed of the fluid emerging from the nozzles. The speed of the fluid is controlled by varying the speed of the prime mover in the usual manner. When it is desired that the vehicle climb a steep grade, where considerable power at low speed is required, the nozzles may be moved so as to direct the stream nearer the outer edges of the turbines; and by selecting the proper position for the nozzles the highest efficiency for each particular load may be obtained.

The device may also be used as a brake upon the motor vehicle by directing the stream from the nozzles against the rear of the vanes, thus tending to drive the wheels in the opposite direction, and exerting a braking effect upon them until the vehicle is brought to a standstill; the nozzles may then be moved so as to direct the stream away from the wheels, or if they continue to direct the stream against the rear of the vanes, the vehicle will move in the reverse direction. The brake bands upon the turbine wheels need be used only in case of emergency, or when the driving motor is stopped.

Figures 4, 5:
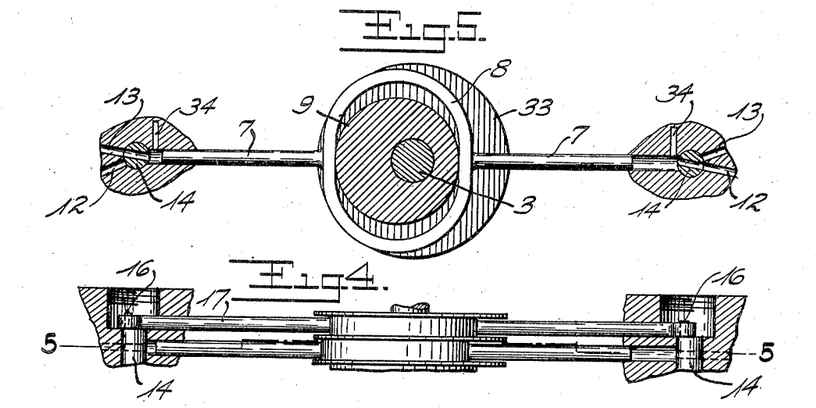
Fig. 4 is a detail, partly in horizontal section, of the valve operating mechanism.
Fig. 5 is a section taken approximately on the line 5—5 of Fig. 4.

It is of course well-known that mercury is practically incompressible. I have found that if provision is made for the trapping of a predetermined quantity of air in each cylinder, with the mercury, at the commencement of each stroke of the piston in that cylinder, the mechanical parts will be safeguarded, the efficiency of the transmission increased, and the velocity of the mercury stream at the nozzle maintained. In the present instance, as shown in Figs. 5 and 6, I provide for the automatic creation of this air cushion or yielding wall for the cylinder by arranging an air-trap chamber 34 offset from the cylinder proper above the same.

It will be noted that the transmission mechanism, of Figs. 1 to 9, has the novel advantages of parallel sets of opposed pistons, actuated from a single cam shaft, with the suction and delivery ports of all the piston-cylinders controlled by two valves; of a plurality of turbines in a common casing all driven by the liquid delivered from the cylinders through the valves, and at different speeds when required; and of the dirigible nozzles for controlling the revolutions per minute and torques of the various turbine wheels; all of these groups of elements being concentrated in close adjacency and in single casing.

Figure 1:
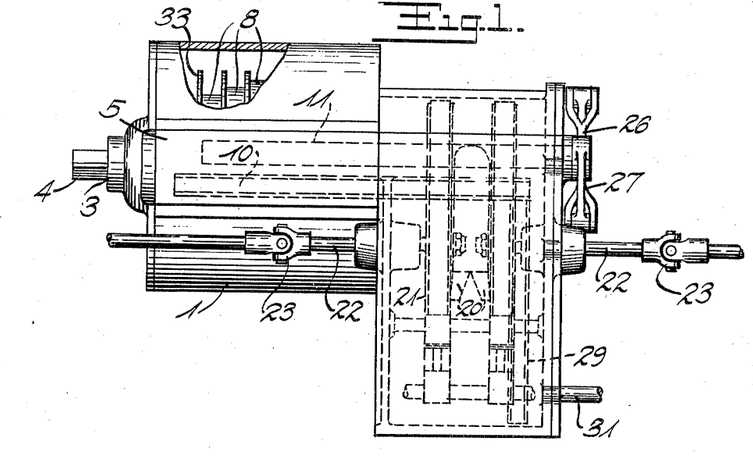
Figure 1 is a side elevation of a transmission, with part of the casing broken away.
Figure 2:
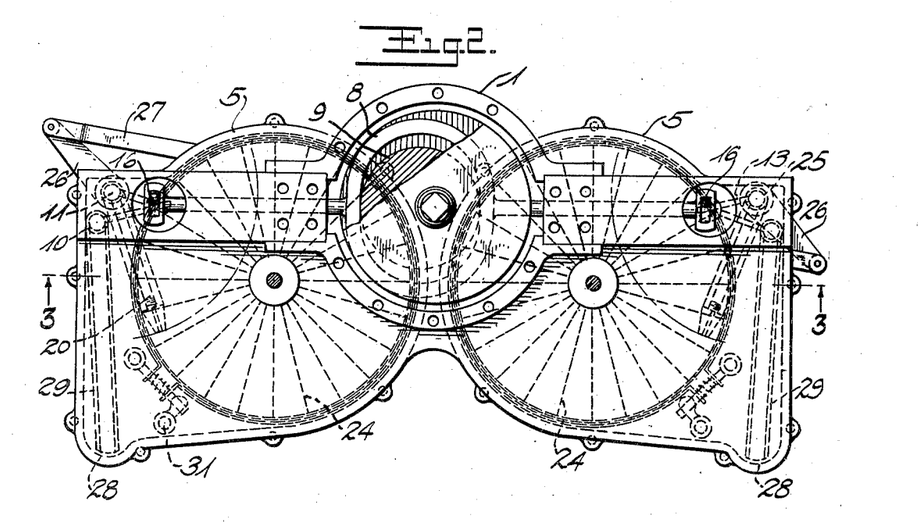
Fig. 2 is an end elevation of the same transmission, with part of the casing broken away, looking from the left hand end of Fig. 1.
Figure 3:
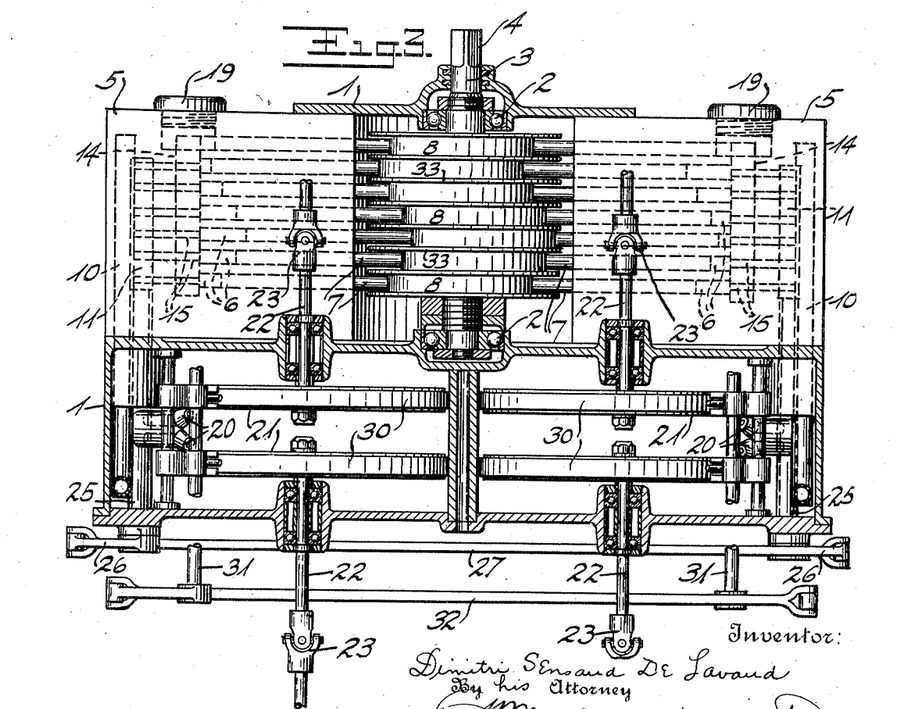
Fig. 3 is a section through the casing taken approximately on the line 3—3 of Fig. 2 looking in the direction of the arrow, and with the elements within the casing shown in elevation.

The modification shown in Figs. 10 to 14, is a transmission mechanism including groups of elements corresponding to the groups of elements of the transmission of Fig. 1, related and operating in a similar manner. The modification of Figs. 10 to 14, however, has simplified control valves, and shorter and simpler connections in the circulating system particularly between the cylinders and the control valves and between the control valves and the nozzles. These shorter and simpler connections are partly brought about by arranging the opposed banks of pistons in line with the turbine wheels and nozzles laterally of the apparatus. This arrangement in turn permits the casing for containing the entire transmission mechanism, including the turbine wheels, to be made very small and light. The construction of Figs. 10 to 14 is also characterized by simplified mechanical connections between the cam-shaft and the control valve for each of the two opposed banks of cylinders; and also has improved anti-friction devices associated with the yokes which engage the cams on the cam-shaft. According to this arrangement, the transmission mechanism of Figs. 10 to 14 is placed in a casing within which are formed three compartments arranged side by side and alined laterally of the mechanism,—a central compartment for containing the cams and yokes, and two duplicate end compartments which contain the turbine wheels and their nozzles, with two turbine wheels in each end compartment. The central cam compartment is separated from each of the end turbine compartments by a block or casting having formed therein the cylinders or bores for the bank of pistons on that side of the transmission and also a bore within which is journaled the rotary control valve common to these last-mentioned pistons, there castings also having short interior canals or passages to connect the cylinders and the valve journal. In each of the end turbine compartments is located a hollow block or casting, for housing two of the turbine wheels; this casting having portions fitting tightly against the casting containing the piston cylinders and the control valve journal, but the interiors of the castings having communication means, as pipes.

Figure 10:
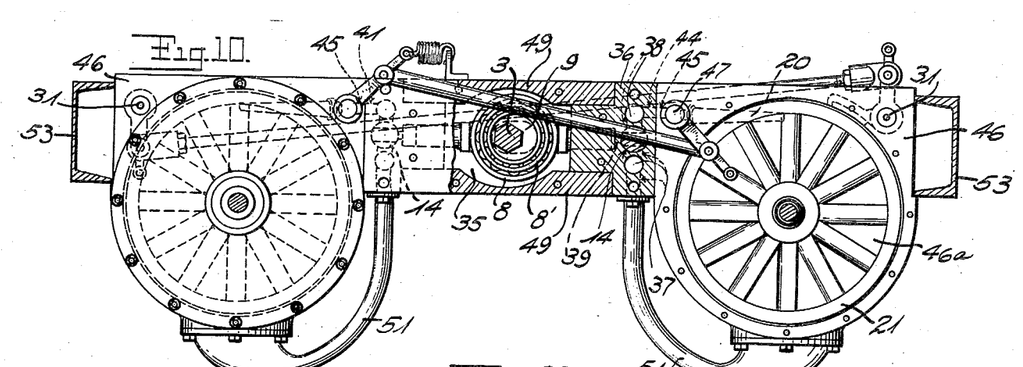
Fig. 10 is an end elevation of a modified form of transmission, partially broken away and partially in section.

Referring to the details of construction shown in Figs. 10 to 14, the main casing has suitably mounted therein, as upon the ball-bearings 2, the shaft 3 adapted to be driven by the prime mover (not shown). The portion of the shaft 3 which passes through the cam compartment 35 is hexagonal in cross-section, as shown in Fig. 10, so that the variously set cams 9 may be easily slipped on the shaft for rotation therewith, as in the case of the cam 9 shown in Fig. 12. Located within the casing and on each side of the cam compartment 35 is a block or casting 36, bored out as shown most clearly in Fig. 13, to provide the cylinders 6 for the pistons 7 on that side of the mechanism. These pistons 7 are each connected to another piston 7 in a cylinder 6 in the casting 36 on the opposite side of the cam compartment 35, by means of a yoke 8 integral with the two pistons. The yoke portions of the various pairs of opposed pistons are located within the compartment 35, each yoke portion taking about one of the cams 9 secured on the shaft 3, so that, when the shaft is rotated, reciprocatory movement is imparted to all the pistons 7. The cams 9 are disposed upon the shaft 3 in different and preferably equally spaced angular relations or phases so as to cause continuous operation and the successive delivery of all the cylinders. The yokes are so formed that ball-bearing cages 8' are housed in the yokes with the balls coacting with the peripheries of the cams and yokes.

Each casting 36 is bored horizontally in line with the outer ends of the piston cylinders to provide a journal or bearing for the rotary valve member 14 common to the bank of cylinders in the casting.

Formed in each casting 36 are horizontal and vertical suction passages 37 and horizontal and vertical delivery passages 38, the vertical passages leading from the horizontal passages to the bore within which the control valve 14 rotates. The heads of the cylinders are also connected with the bore within which the valve works, by means of passages as indicated at 39. The valve member 14 is provided with a separate passage therethrough for each pump cylinder as indicated at 40 in Fig. 13, which passage is adapted to place the cylinder 6 opposite the same in communication with the suction passages 37 or the delivery passages 38.

The two valve members 14 are simultaneously actuable by means of a chain 41, engaging a sprocket 42 secured on the cam-shaft 3 and passing over sprockets 43 secured on the valve members 14. The passages 40 in the valve members 14 are disposed in different angular positions, so as to bring each cylinder into communication with the passages 37 or 38 at the proper instant, as determined by the setting of the actuating cam 9 for that particular cylinder upon the shaft 3. The delivery passages 38 communicate with short passages 44 (Fig. 10) which in turn communicate with the registering short passages 45 formed in the ring-shaped blocks or castings 46. These delivery passages 45 lead to the interiors of the hollow rotary shafts 47 journaled in the ring-shaped castings 46; the arrangement of the journals, passages 45 and hollow shafts being such that the interiors of the shafts and the passages 45 are in communication irrespective of the angular adjustment of the shafts.

Figure 11:
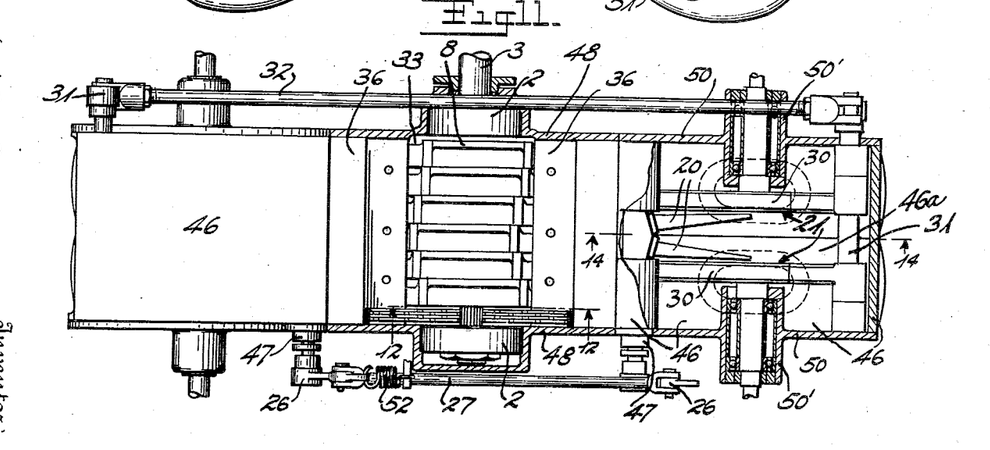
Fig. 11 is a top plan of the transmission of Fig. 10, also partially broken away and partially in section.

It will be noted from Fig. 11 that the bearings 2 for the main shaft 3 are seated in pockets formed inside plates 48 which, together with top and bottom castings 49 and the cylinder castings 36, form the cam compartment 35. The end turbine compartments 46ª are partially formed by the hollow castings 46, the compartments being closed by side plates 50 which carry pockets 50' within which are seated bearings for the turbine wheels 21.

In each turbine compartment 46ª the two turbine nozzles 20 are secured on an exposed intermediate portion of the hollow rotary shaft 47, between the two turbine wheels, and are so arranged that liquid delivered to the hollow shaft from the piston cylinders on that side of the mechanism is discharged from the nozzles to drive the wheels when the nozzles are in driving position. The parts are so designed that the hollow shaft 47 may be rotated to position the nozzles to direct their streams at any selected point between the inner and outer ends of the vanes of the turbine wheels, and so as to rotate the wheels in either direction, and to allow of the nozzles assuming positions in which the streams will not touch the vanes of the wheels and no power will be transmitted.

The liquid after it has passed through the turbine wheel vanes, flows from the turbine compartment 46ª down into curved conduits 51, arranged exterior to the casing, whence it is drawn up into the suction passages 37 and into the cylinders on the respective suction strokes of their pistons and recirculated through the system.

Figure 12:
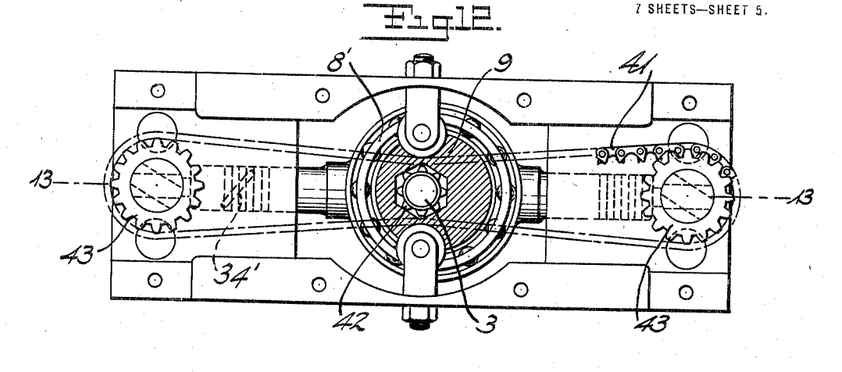
Fig. 12 is a lateral vertical section, on an enlarged scale, taken on the line 12—12 of Fig. 11.
Figure 13:
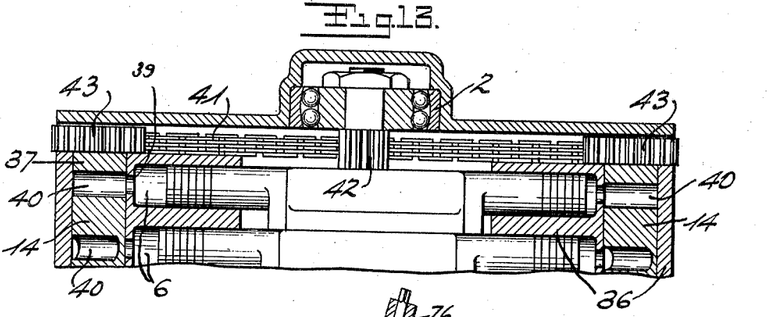
Fig. 13 is a sectional bottom plan, on the same scale as Fig. 12, and taken on the line 13—13 thereof.

Provision for the automatic trapping of a certain amount of air in each pumping cylinder, to be used as an air cushion during the pumping stroke of the piston in that cylinder, is made in the present instance by providing an upwardly inclined cavity 34' in the working end of each piston, as indicated in broken lines in the case of one of the pistons of Fig. 12.

In order that all four nozzles may be adjusted to transmit equal power to each of the four wheels at all speeds, as would be desirable in the case of an automobile, the two hollow shafts 47 may have arms 26 secured thereto, interconnected by the rod 27 so that the rod may be operated against a spring 52 to move all the turbine nozzles simultaneously. The brake band 30 may also be provided, if desired, and the operating devices 31 thereon may be connected together by a common operating rod 32.

Figures 14, 15:
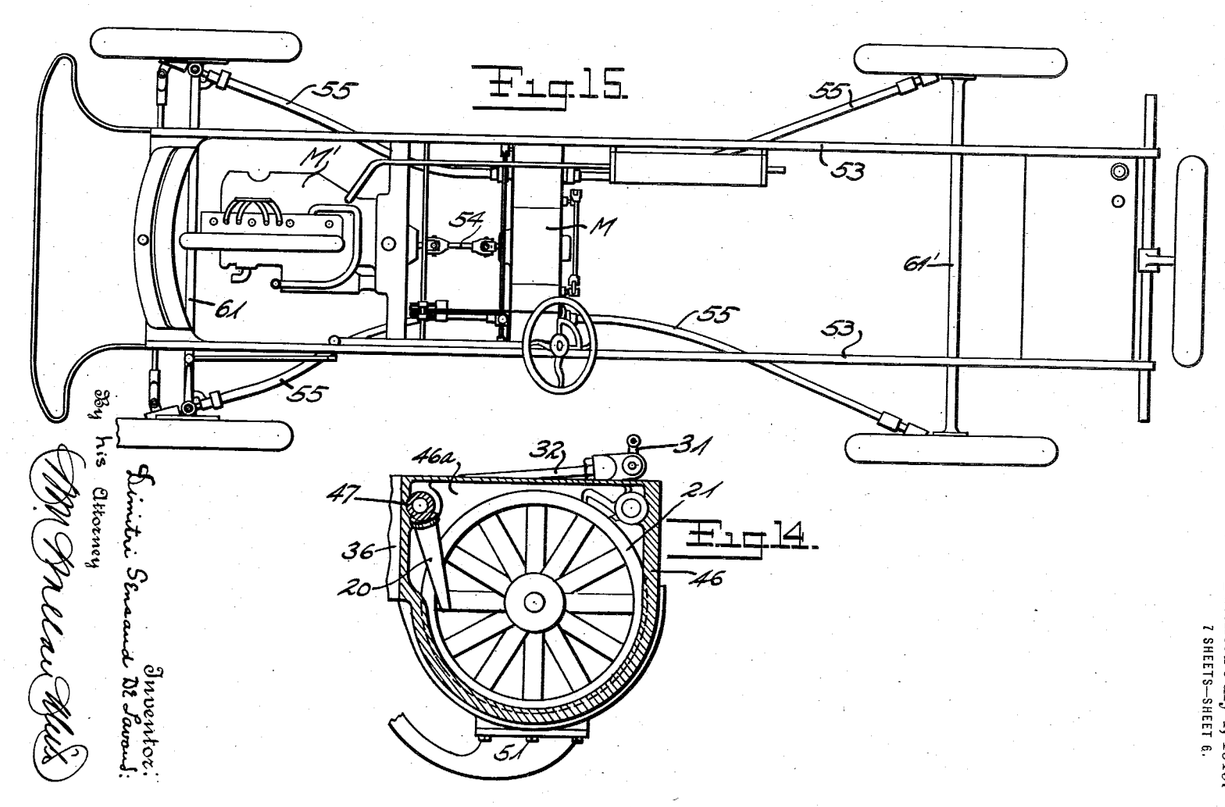
Fig. 14 is a lateral vertical section, taken on the line 14—14 of Fig. 11.
Fig. 15 shows a frame and running and steering gear of an automobile equipped with the transmission of Fig. 10.
Figure 16:
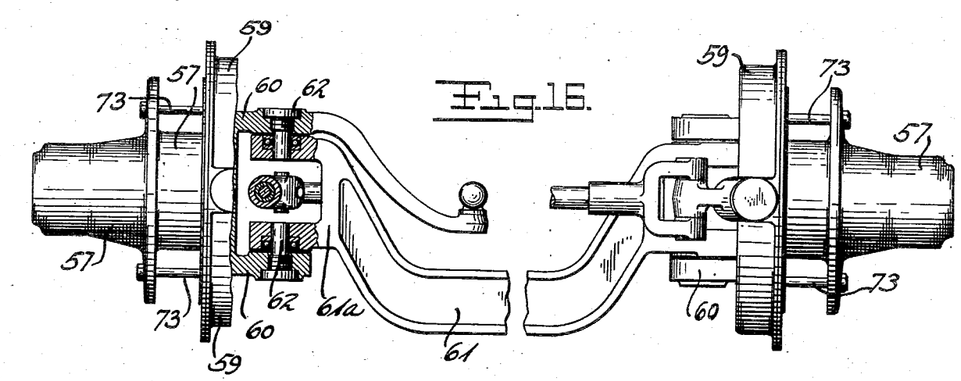
Fig. 16 is a front elevation of the front axle of the automobile of Fig. 15, including the hubs of the front wheels and certain driving and steering elements, some of the parts being broken away and shown in section.
Figure 17:
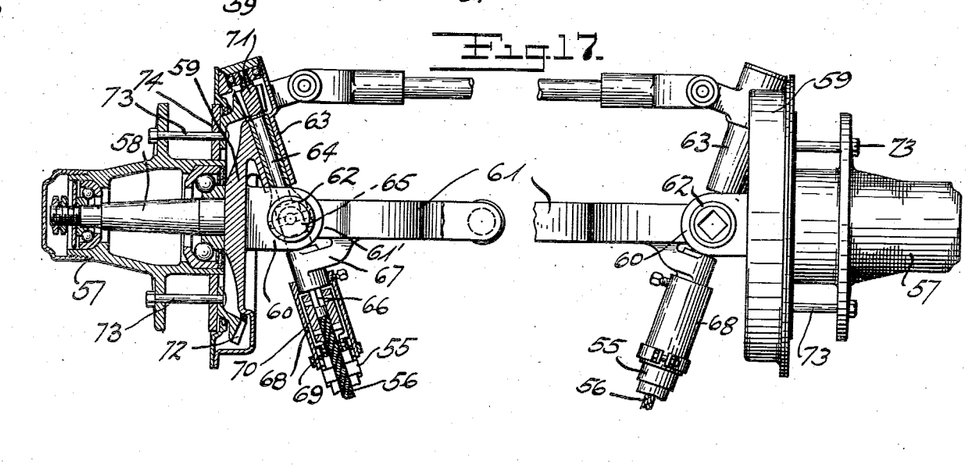
Fig. 17 is a view in bottom plan, partially broken away and partially in section, showing the parts of Fig. 16.
Figure 18:
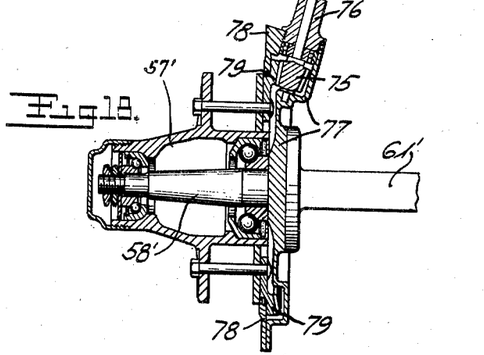
Fig. 18 is a sectional view showing one end of the rear axle of the automobile of Fig. 15 and illustrating the construction of and driving connections for each of the rear wheels.

As indicated in Fig. 10, the mechanism just described may be mounted on the frame 53 of an automobile. In Fig. 15, the mechanism, indicated at M, is shown on the frame 53, with the driving shaft of the mechanism connected to the crank shaft of the motor M' by means of an intermediate shaft 54. Each of the four turbine shafts is secured to one end of a flexible shaft passing through a protecting tube 55, the other end of the shaft being secured to the shaft of a gear for driving one of the wheels of the vehicle. Two of the flexible shafts are shown at 56 in Fig. 17, Figs. 16 and 17 illustrating the construction of the front axle on which the wheels of the vehicle are rotated on vertical axes for steering. The wheel hubs 57 turn on horizontal stub shafts 58 carried by wheel mounts 59 provided with upper and lower lugs 60 between which the forked ends 61ª of the front axle 61 are vertically pivoted as shown at 62. Between the upper and lower lugs 60 on each mount 59 is a horizontal tubular extension 63, providing a bearing, at an angle to the plane of the wheel, within which is journaled a shaft 64 operatively connected at one end, by means of a Cardan joint 65, as indicated in broken lines in Fig. 17, to a shaft 66 journaled in a bracket 67 offset from the axle 61. This shaft 66 is secured to the front end of a flexible shaft 56 driven by the liquid transmission mechanism. A sleeve 68 is provided, secured at one end to the bracket 67 and at the other to the adjacent end of the protecting tube 55 which leads back to the transmitting mechanism, this sleeve providing a ball-bearing, as indicated at 69, for a spindle 70 housed in the sleeve and surrounding the junction of shafts 56 and 66. The shaft 64 at its forward end has secured thereon a beveled pinion 71. This beveled pinion drives a beveled gear 72 secured to the wheel hub by the bolts 73, when the bolts are screwed up to draw the annular plate 74 against the inner ends of the wheel spokes (not shown). In the case of the wheel hubs on the rear axle, there is no necessity for providing for movement of the wheels about vertical axes relative to the axle, and consequently each of the two flexible shafts leading to a rear wheel of the vehicle may be secured directly to a driving pinion for the wheel journaled in a bearing fixedly carried by the axle. Such construction is shown in Fig. 18, where the axle is indicated at 61' and the hub of a rear wheel at 57'; the beveled pinion 75 being journaled in a bracket 76 supported by the parts 77 and 78 mounted on the end of the axle. These parts 77 and 78 house between them a beveled gear 79 meshing with the beveled pinion 75 and secured to the wheel hub.

Having now described my invention, what I claim as new and desire to secure by Letters Patent is:

1. In a fluid power transmission, the combination comprising a plurality of reciprocating pumps, a main fluid delivery passage, a main fluid suction passage, branch passages leading from each pump to both said main passages, a single common valve member interposed in all said branch passages and provided with a plurality of passages, and an operative connection between the pumps and the valve member for actuating the valve member to place certain passages of the valve member successively in suction communication with certain of the branch passages and simultaneously to place certain other of the passages of the valve member in delivery communication with certain of the branch passages.

2. In a fluid power transmission, the combination comprising a plurality of reciprocating pumps, a main fluid delivery passage, a main fluid suction passage, branch passages connecting each pump and both said main passages, a single common valve member provided with passages adapted to be placed in communication with said branch passages, a cam-shaft, cams on the shaft for actuating the pumps and an operative connection between the cam-shaft and the valve member whereby the valve member operates to place different groups of pumps successively in communication with suction branch passages and delivery branch passages at the instant a cam actuates a group of pumps in proper relation to such branch passages.

3. In a fluid power transmission, the combination comprising a plurality of reciprocating pumps, a main fluid delivery passage, a main fluid suction passage, branch passages leading from each pump to each of said main passages, and a common rotary valve member provided with passages each adapted to be placed successively in communication with the corresponding branch suction and delivery passages.

4. In a fluid power transmission, the combination comprising a series of piston pumps, turbine wheels, means for directing fluid pumped against the said wheels, means for varying the point of delivery of fluid to the wheels, connections for returning the used fluid to the pumps, and a hermetically sealed box within which said apparatus is located.

5. In a fluid power transmission, the combination comprising a closed casing, a cam shaft passing through substantially the middle of the casing, banks of piston pumps in the casing on opposite sides of the cam shaft, cams on the cam shaft for operating the pistons in pairs, timing valves for each bank of piston pumps, mechanical connections between the cam shaft and the timing valves for operating the valves in timed relation to the operations of the piston pumps, a turbine wheel within the casing at each side of the cam-shaft, a turbine nozzle therefor, and liquid conveying connections between the bank of pumps on that side of the casing, the timing valve for said bank and said nozzle.

6. In a transmission of the kind described, in combination, a closed casing containing fluids of different degrees of compressibility, a driven shaft within the casing, a nozzle within the casing for delivering liquid toward the driven shaft, liquid engaging means on the shaft for causing rotation of the shaft by liquid issuing from the nozzle, a liquid pump driven by the driving shaft and including a liquid impeller and a housing for the impeller, a delivery liquid connection between the housing and the nozzle, and a suction delivery connection between the housing and the casing adjacent to the driven shaft; of the two parts, the impeller and the housing, one having a chamber for trapping a more highly compressible fluid than said liquid within the pump at the commencement of a delivery stroke of the impeller.

In testimony whereof I have signed my name to this specification.

DIMITRI SENSAUD DE LAVAUD.